United States Patent [19]

Yasui

[11] 4,384,734

[45] May 24, 1983

[54] PASSENGER PROTECTION APPARATUS

[75] Inventor: Toshio Yasui, Anjo, Japan

[73] Assignee: Nippondenso Co., Ltd., Kariya, Japan

[21] Appl. No.: 242,828

[22] Filed: Mar. 12, 1981

[30] Foreign Application Priority Data

Mar. 25, 1980 [JP] Japan .................................. 55-40071

[51] Int. Cl.³ ............................................. B60R 21/08
[52] U.S. Cl. ..................................... 280/735; 180/282
[58] Field of Search ....................... 280/735, 734, 728; 180/268, 274, 282; 307/10 R; 340/52 H

[56] References Cited

U.S. PATENT DOCUMENTS 3,767,002  10/1973  Gillund ................................ 280/735
3,871,472  3/1975   Hosaka et al. ....................... 280/735
3,887,819  6/1975   Korasaka ............................. 280/735
4,222,030  9/1980   Yasui et al. .......................... 280/735

Primary Examiner—Joseph F. Peters, Jr.
Assistant Examiner—Donn McGiehan
Attorney, Agent, or Firm—Cushman, Darby & Cushman

[57] ABSTRACT

A passenger protection system comprises an air bag operating circuit having a G sensor and a squib, and a back-up circuit connected in parallel to the operating circuit. A terminal of the parallel circuit including the air bag operating circuit and the back-up circuit is connected to the body earth through a battery mounted in the automobile, and the other terminal thereof is grounded through a diode, thus making it possible to supply power to squib for expansion of the air bag even if the G sensor is short-circuited on the occasion of an automobile collision.

2 Claims, 3 Drawing Figures

PASSENGER PROTECTION APPARATUS

BACKGROUND OF THE INVENTION

The present invention realtes to a passenger protection system such as an air bag in particular to a back-up circuit of the system.

SUMMARY OF THE INVENTION

An object of the present invention is to provide a system which does not lose its function of back-up in the case of wire grounding (shorting with the body earth) at the time of collision of an automobile.

According to the present invention, there is provided a passenger protection system in which a diode included in the back-up circuit is connected to the body earth so that the current may be supplied to a squib through a closed circuit from a capacitor thereby to inflate an air bag even when the wire is grounded by the collision.

DESCRIPTION OF THE PREFERRED EMBODIMENTS

Figure 1:
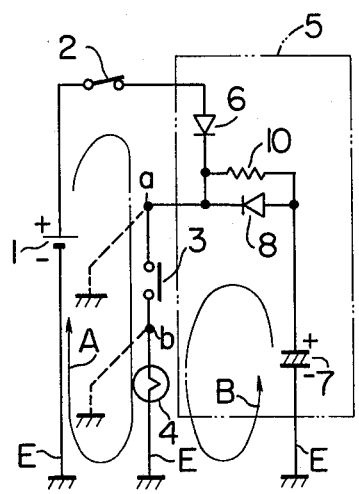
FIG. 1 is an electric wiring diagram of a conventional system.

A configuration of a conventional system is shown in FIG. 1. Reference numeral 1 shows a battery mounted on an automobile, numeral 2 an ignition switch for a key switch, numeral 3 a collision sensor adapted to be closed for detection of the acceleration at the time of a collision, numeral 4 a squib for initiating the expansion of an air bag, and numeral 5 a back-up circuit for supplying the current to the squib 4 even in the event that the terminal is removed from the battery on the occasion of the collision of the car. The back-up circuit 5 includes diodes 6, 8, a back-up capacitor 7, and a charging resistor 10.

In FIG. 1, when the switch 2 is closed, the capacitor 7 is fully charged at the polarity shown through the route including the positive terminal of the battery 1, the switch 2, the diode 6, the resistor 10, the capacitor 7, the body earth E and the negative terminal of the battery 1. If the sensor 3 is closed under this condition by a collision, the current is supplied to the squib 4 through two routes A and B, the route A including the positive terminal of the battery 1, the switch 2, the diode 6, the sensor 3, the squib 4, the body earth E and the negative terminal of the battery 1, and the route B including the positive terminal of the capacitor 7, the diode 8, the sensor 3, the squib 4, the body earth, and the negative terminal of the capacitor 7. The resulting operation of the squib protects the passenger from the collision shock by expansion of the air bag (not shown).

If the electric wire extending near the automobile body is grounded to the body earth at a point a or b upon collision, however, the current fails to be supplied to the squib 4 neither through the route A or B and the air bag cannot be expanded, thus making it impossible to achieve the object of the air bag system to protect the passengers from shock collision.

According to the present invention, the diode 6 is connected to the body earth thereby to eliminate the inoperativeness of the air bag by the wire grounding at the time of a collision, thus providing a reliable air bag system.

Figure 2:
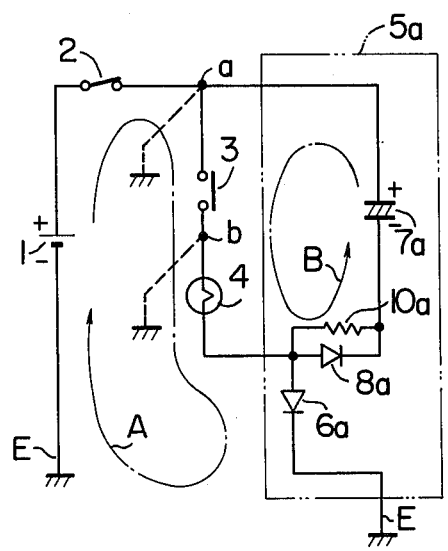
FIG. 2 is an electric wiring diagram showing an embodiment of the present invention.

The present invention will be described below with reference to the embodiments shown in the accompanying drawings. A first embodiment of the invention is shown in FIG. 2. The construction of this embodiment is similar to that of FIG. 1 in that the battery 1 mounted on the car is connected in series with the ignition switch 2 and further to the collision sensor 3 for detecting the car acceleration and to the squib 4 for expanding the air bag at the time of collision. The feature of this embodiment, however, lies in the construction of the back-up circuit 5a and the connection to the sensor 3 and the squib 4.

Specifically, in the back-up circuit 5a, reference symbol 6a shows a diode connected to the body earth, 7a a back-up capacitor for storing electric charges at the time of closing of the ignition switch 2, numeral 8a a diode connected in series with the back-up capacitor 7a, and numeral 10a a charging resistor connected in series with the back-up capacitor 7a. An operating circuit including the sensor 3 in series with the squib 4 is connected with the back-up capacitor 7a connected in series with the parallel-connected diode 8a and charging resistor 10a thereby forming a loop circuit. On the other hand, the diode 6a is inserted between the junction point of the operating circuit and the diode 8a and the body earth, thus electrically separating the closed loop from the body earth.

Now, the operation of this circuit construction will be described.

Assuming that the ignition switch 2 is closed for starting the driving of the automobile. The current flows through the route including the positive terminal of the battery 1, the switch 2, the back-up capacitor 7a, the charging resistor 10a, the diode 6a, the body earth E and the negative terminal of the battery 1, thus charging the back-up capacitor 7a to the full at the polarity shown.

Subsequently when the sensor 3 is closed by the collision of the car being driven, the squib 4 is supplied with current through at least one of the routes A and B, the route A including the positive terminal of the battery 1, the switch 2, the sensor 3, the squib 4, the diode 6a, the body earth E and the negative terminal of the battery 1, and the route B including the positive terminal of the back-up capacitor 7a, the sensor 3, the squib 4, the diode 8a and the negative terminal of the back-up capacitor 7a. As a result, the squib 4 expands the air bag thereby to protect the passenger or driver from the shock of the collision.

If the collision causes at least one of the points a and b of the electric wire connected to the sensor 3 to be grounded, namely, it is short-circuited to the body earth, then the current fails to be supplied to the squib 4 through the route A. On this occasion, the positive terminal of the capacitor 7a is grounded to the body earth to render the potential at the negative terminal much lower than that of the body earth. But the diode 6a prevents the capacitor 7a from being charged in the reverse direction, with the result that the current is capable of being supplied from the backup capacitor 7a to the squib 4 to expand the air bag, thus protecting the passenger or driver from the shock of collision.

Figure 3:
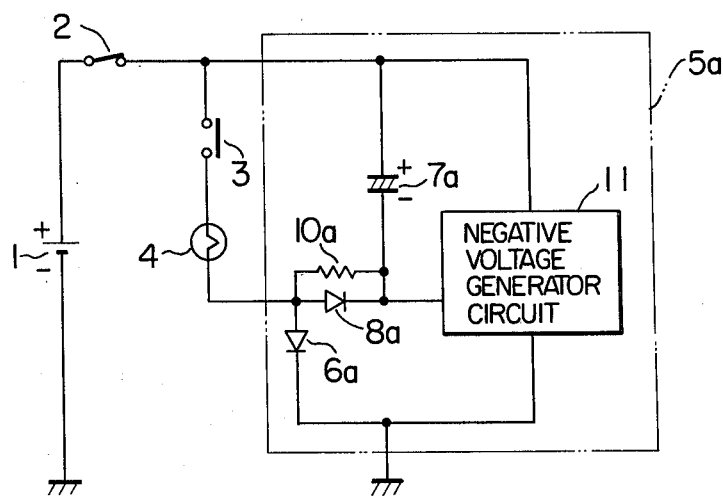
FIG. 3 is an electric wiring diagram showing another embodiment of the present invention.

Another embodiment of the present invention is shown in FIG. 3. Numeral 11 shows a negative voltage generator circuit for generating a high voltage pulse, which keeps the charge voltage of the capacitor 7a at a high level. Even when the series resistance of the route B (such as the wire resistance, the contact resistance of the connector and the equivalent series resistance of the diode 8a) increases to some degree, the squib 4 is capable of being supplied with sufficient amount of current.

The present invention may be applied with equal effect also to passenger protection systems other than an air bag.

I claim:

1. A passenger protection system for use in an automobile having a key switch and a battery including two terminals one of which is connected to a body earth comprising:

a detector switch, a responsive element connected in series with said detection switch, a capacitor and a first diode, said detection switch and said responsive element making up an operating circuit, said capacitor and said first diode making up a back-up circuit, said operating circuit and said back-up circuit making up a closed loop circuit, the junction point of said operating circuit and said capacitor being connectable to the other of said battery terminals through said key switch, a second diode for connecting the junction point of said operating circuit and said first diode to a body earth, wherein said back-up circuit includes a negative voltage generator circuit connected in parallel to said capacitor for applying a voltage pulse to said capacitor.

2. A passenger protection system including an air bag operating circuit having a collision sensor for detecting the acceleration of the automobile body at the time of collision connected in series with a squib for expanding the air bag, and a back-up circuit having a back-up capacitor and a first diode connected in series with said back-up capacitor, said back-up circuit being connected in parallel to said operating circuit, said passenger protection system comprising means for connecting the junction point of said operating circuit and said back-up capacitor to an automobile-carried battery through an ignition switch, a second diode inserted between the junction point of said operating circuit and said first diode and the automobile body earth, and a negative voltage generator circuit connected in parallel to said back-up capacitor for applying a high voltage pulse to said capacitor.

* * * * *